(12) United States Patent
Nose et al.

(10) Patent No.: US 8,355,032 B2
(45) Date of Patent: Jan. 15, 2013

(54) DISPLAYING APPARATUS, DISPLAYING PANEL DRIVER AND DISPLAYING PANEL DRIVING METHOD

(75) Inventors: Takashi Nose, Kanagawa (JP); Hirobumi Furihata, Kanagawa (JP); Yoshihiko Hori, Kanagawa (JP); Hiroshi Tsuchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 748 days.

(21) Appl. No.: 12/320,051

(22) Filed: Jan. 15, 2009

(65) Prior Publication Data

US 2009/0184983 A1 Jul. 23, 2009

(30) Foreign Application Priority Data

Jan. 22, 2008 (JP) ................................ 2008-011418

(51) Int. Cl.
*G09G 3/36* (2006.01)
*G09G 5/10* (2006.01)
*G09G 5/02* (2006.01)
*G06K 9/32* (2006.01)

(52) U.S. Cl. ........... 345/690; 345/89; 345/698; 382/298

(58) Field of Classification Search .................... 345/89, 345/690, 694, 596, 671, 698–699; 382/298–299
See application file for complete search history.

(56) References Cited

U.S. PATENT DOCUMENTS 6,556,214 B1 4/2003 Yamada et al.
6,747,669 B1 * 6/2004 Yamaguchi et al. .......... 345/690
6,788,306 B2 9/2004 Yamaguchi et al.
7,643,042 B2 * 1/2010 Kudo et al. ................... 345/690
2002/0105491 A1 * 8/2002 Yamaguchi et al. ............ 345/89
2005/0190207 A1 * 9/2005 Kudo et al. ................... 345/690
2008/0143757 A1 * 6/2008 Furihata et al. ............... 345/690

FOREIGN PATENT DOCUMENTS

JP 9-90902 4/1997
JP 2000-163005 A 6/2000
JP 3735529 6/2002

OTHER PUBLICATIONS

Japanese Notification of Reasons for Refusal dated May 11, 2012 with partial English-language translation.

* cited by examiner

*Primary Examiner* — Bipin Shalwala
*Assistant Examiner* — Matthew Fry
(74) *Attorney, Agent, or Firm* — McGinn IP Law Group, PLLC

(57) ABSTRACT

A display apparatus includes a display panel; and a display panel driver configured to drive signal lines of the display panel. The display panel driver includes: a color reducing circuit configured to be possible to generate a first color reduction image data from a first input image data by executing an error diffusion process by using a first error value, and to generate a second color reduction image data from the first input image data by executing the error diffusion process by using a second error value which is different from the first error value; and a driving section configured to drive a first pixel positioned on a horizontal line of the display panel in response to the first color reduction image data, and drive a second pixel positioned on the horizontal line and adjacent to a the first pixel in a horizontal direction, in response to the second color reduction image data.

8 Claims, 15 Drawing Sheets

DISPLAYING APPARATUS, DISPLAYING PANEL DRIVER AND DISPLAYING PANEL DRIVING METHOD

INCORPORATION BY REFERENCE

This patent application claims priority on convention based on Japanese Patent Application No. 2008-011418. The disclosure thereof is incorporated herein by reference.

BACKGROUND OF THE INVENTION

1. Field of the Invention

The present invention relates to a display apparatus, a display panel driver and a display panel driving method, and more particularly relates to a driving technique of a display panel to execute a color reducing process and an enlarging process to image data at a same time.

2. Description of Related Art

One of requests to an LCD panel (liquid crystal display panel) installed in a portable terminal is in increase in the number of colors to be displayed. In order to satisfy this request, the LCD driver for driving the LCD panel is needed to deal with a multiple gradation display. One problem lies in increase in a chip size, when the number of the displayable gradations of the LCD driver is increased. In order to increase the number of the displayable gradations, a D/A converter used to drive signal lines is needed to deal with a large number of gradations, and this causes the increase in the chip size.

One scheme for suppressing the increase in the chip size that results from the increase in the number of the gradations lies in that the LCD driver includes a color reducing circuit, and a pseudo gradation display is performed to substantially attain the multiple gradation display. For example, Japanese Patent No. 3,735,529 and Japanese Patent Application Publication (JP-A-Heisei, 9-90902) disclose a technique that a color reducing process is executed through error diffusion and further attains the pseudo gradation display by using FRC (frame rate control).

Another request to the LCD panel installed in the portable terminal lies in increase in the number of pixels. In recent years, the LCD panel is used that has the number of pixels more than the number of pixels defined by VGA (video graphic array). However, the increase in the number of pixels increases a data transfer amount to the LCD driver from an image processing unit such as CPU or DSP (digital signal processor), and consequently increases consumption of electric power and EMI (electromagnetic interference) of the LCD driver.

The inventor considers one scheme to solve the above problems of the increases in the electric power consumption and EMI that result from the increase in the number of pixels, in which the size of an image is selected on the basis of a kind of the image to be displayed (for example, VGA, QVCA (quarter VGA) and the like) and also an enlarging process, namely, a function of enlarging the image is given to the LCD driver. For example, it is assumed that the LCD panel has the number of pixels corresponding to VGA. In displaying the image for which a high quality display is requested such as a photograph, the image data of VGA is sent to the LCD driver, and the image is displayed at a same magnification. On the other hand, in displaying the image in which a relatively low resolution is allowable such as the display screen of a game or mail, the enlarging process is executed such that the image data of QVGA is sent to the LCD driver and then the image is enlarged to twice in both of a horizontal direction and a vertical direction by the LCD driver. The enlargement of the image in the horizontal direction is attained by driving the two pixels arrayed in the horizontal direction in accordance with the same image data, as the easiest manner. The enlargement of the image in the vertical direction is attained by driving the adjacent two scan lines sequentially (or at the same time), in the state that the signal line is driven to a desirable drive voltage. Since such a scheme is used to perform the image display, it is possible to decrease the data transfer amount to the LCD driver and decrease consumption of electric power and EMI.

In order to attain the correspondence to the multiple gradation display and the reduction in the consumption of electric power and the EMI at the same time, the color reducing process and the enlarging process are desired to be used at the same time. However, according to the consideration of the inventor, when the color reducing process and the enlarging process are simply combined, there is a possibility of deterioration of the image such as generation of flicker. For example, FIGS. 1A and 1B are diagrams showing an example of operation of the LCD driver, in which although the image of VGA is kept in its original state, the enlarging process to double in a column and a row directions is executed on the image of QVGA.

At first, it is assumed that the image data of VGA is supplied in which the gradation values of all of pixels of the image data are 18. In this case, as shown in FIG. 1A, the color reduction image data in which the pixel whose gradation value is 16 and the pixel whose gradation value is 20 are alternately repeated is generated through the color reducing process. Then, the LCD panel is driven in accordance with this color reduction image data.

On the other hand, it is assumed that the image data of QVGA is supplied in which the gradation values of all the pixels of the image data are 18. After the color reducing process is executed on the image data of QVGA, when the enlarging process to double in the column and row directions is executed, a matrix of 2×2 pixels in which the gradation value is 20 and a matrix of 2×2 pixels in which the gradation value is 20 are arranged on the LCD panel in a checker-wise pattern, as shown in FIG. 1B. In this way, when the color reducing process and the enlarging process are executed simply at the same time, a spatial frequency of a brightness change falls, thereby generating flicker.

SUMMARY

It is an object of the present invention to provide a driving technique that deterioration of an image can be prevented, even if a color reducing process and an enlarging process of the image are combined.

In an aspect of the present invention, a display apparatus includes: a display panel; and a display panel driver configured to drive signal lines of the display panel. The display panel driver includes: a color reducing circuit configured to be possible to generate a first color reduction image data from a first input image data by executing an error diffusion process by using a first error value, and to generate a second color reduction image data from the first input image data by executing the error diffusion process by using a second error value which is different from the first error value; and a driving section configured to drive a first pixel positioned on a horizontal line of the display panel in response to the first color reduction image data, and drive a second pixel positioned on the horizontal line and adjacent to a the first pixel in a horizontal direction, in response to the second color reduction image data.

In another aspect of the present invention, a display panel driver which drives signal lines of a display panel, includes: a color reducing circuit configured to generate a first color reduction image data from a first input image data by executing an error diffusion process by using a first error value, and generate a second color reduction image data from the first input image data by executing the error diffusion process by using a second error value different from the first error value; and a driving section configured to drive a first pixel positioned on a horizontal line of the display panel in response to the first color reduction image data, and drive a second pixel positioned on the horizontal line and adjacent to the first pixel in a horizontal direction in response to the second color reduction image data.

In still another aspect of the present invention, a color reducing circuit includes: a first circuit section configured to generate a first color reduction image data and a second error value from a first input image data by executing an error diffusion process by using a first error value; and a second circuit section configured to generate a second color reduction image data from the first input image data by executing the error diffusion process by using a second error value.

In another aspect of the present invention, a display panel driving method is achieved: by driving a first pixel and a second pixel positioned on a first line in response to a first input image data when the first input image data is supplied as image data of a first format; and by driving the first pixel in response to a second input image data and the second pixel in response to a third input image data, when the second and third input image data are supplied as image data of a second format which is different from the first format. The driving a first pixel and a second pixel is achieved: by generating a first color reduction image data by executing an error diffusion process to the first input image data by using a first error value; by generating a second color reduction image data by executing the error diffusion process to the first input image data by using a second error value different from the first error value; by driving the first pixel in response to the first color reduction image data; and by driving the second pixel in response to the second color reduction image data. The driving the first pixel is achieved: by generating a third color reduction image data by executing the error diffusion process to the second input image data; by generating a fourth color reduction image data by executing the error diffusion process to the third input image data; by driving the first pixel in response to the third color reduction image data; and by driving the second pixel in response to the fourth color reduction image data.

According to the present invention, it is possible to provide the driving technique that deterioration of an image can be prevented, even if a color reducing process and an enlarging process of the image are combined.

BRIEF DESCRIPTION OF DRAWINGS

The above and other objects, advantages and features of the present invention will be more apparent from the following description of certain embodiments taken in conjunction with the accompanying drawings, in which.

DESCRIPTION OF THE PREFERRED EMBODIMENTS

Hereinafter, a liquid crystal display apparatus of the present invention will be described in detail with reference to the attached drawings.

Figure 1A:
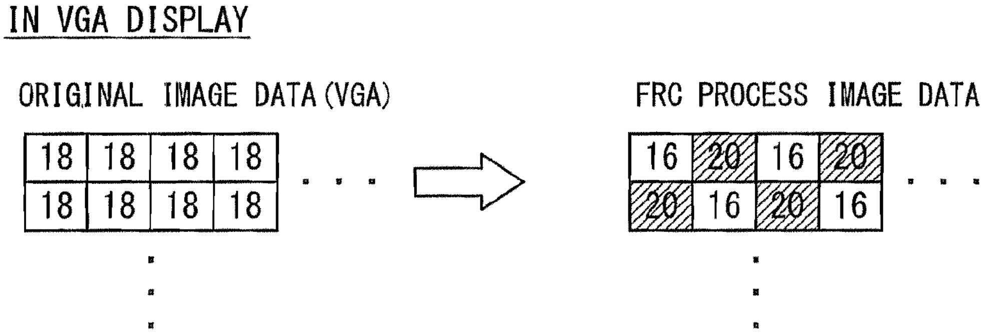
Fig. 1A RELATED ART
FIG. 1A is a conceptual view showing an example of an operation of an LCD driver, when an image data of VGA whose gradation values of all pixels are 18 is supplied and a color reducing process is executed on the image data.
Figure 1B:
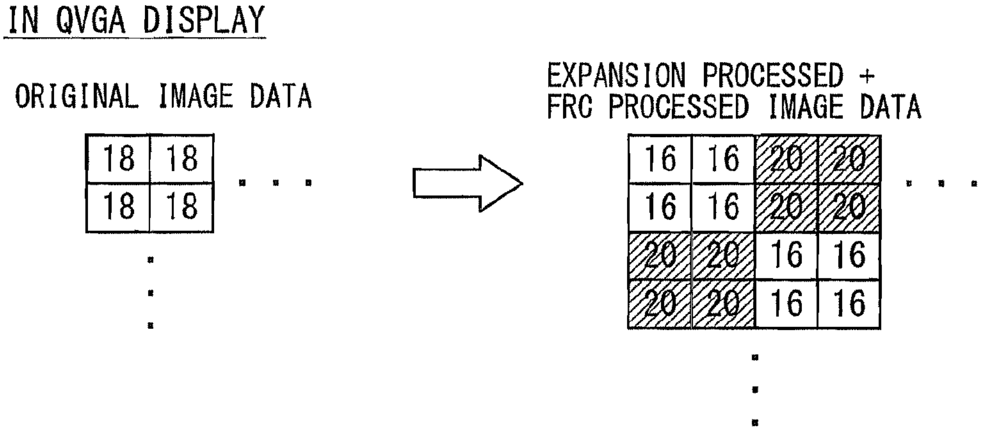
Fig. 1B RELATED ART
FIG. 1B is a conceptual view showing an example of an operation of the LCD panel when the image data of QVGA whose gradation values of all pixels are 18 is supplied, and the color reducing process and an enlarging process is executed on the image data.
Figure 2:
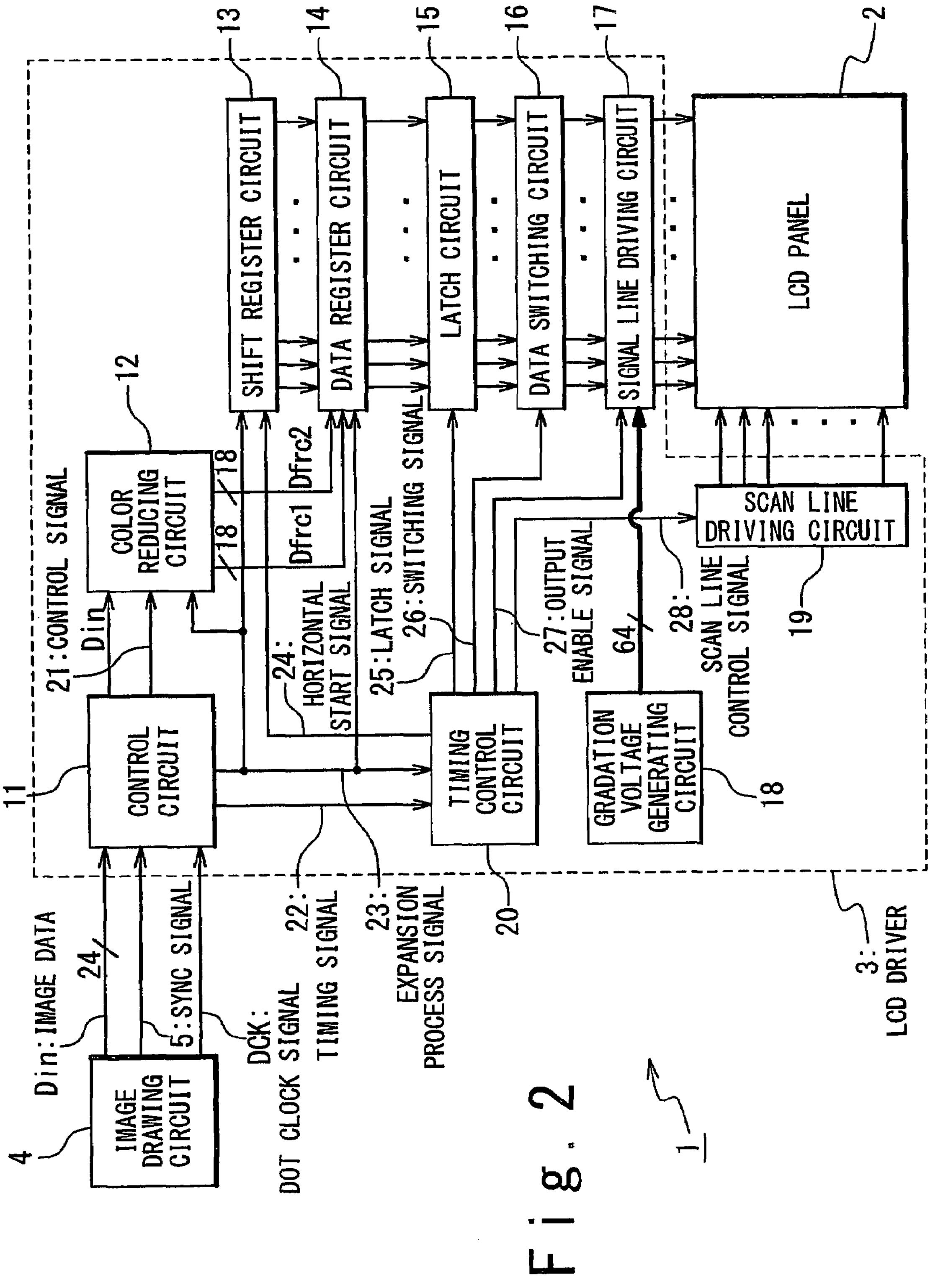
FIG. 2 is a block diagram showing the configuration of a liquid crystal display apparatus according to one embodiment of the present invention.

FIG. 2 is a block diagram showing the configuration of a liquid crystal display apparatus 1 according to an embodiment of the present invention. The liquid crystal display apparatus 1 includes an LCD panel 2 and a LCD driver 3. In this embodiment, the LCD panel 2 corresponds to the VGA, and image data of VGA or image data of QVGA is supplied to the LCD driver 3 on the basis of a kind of an image.

On the LCD panel 2, pixels of m rows and n columns are arrayed in a matrix. The pixels arranged on one row in a horizontal direction of the LCD panel 2 are referred to as the pixels for one horizontal line. Each of the pixels includes three sub pixels arrayed in the horizontal direction. One of the three sub pixels is an R sub pixel for displaying a red (R)

color, and another is a G sub pixel for displaying a green (G) color, and the other one is a B sub pixel for displaying a blue (B) color. A thin film transistor (TFT) and a pixel electrode are provided for each sub pixel. In order to drive the pixels of m rows and n columns, m scan lines (gate lines) extending in the horizontal direction and 3n signal lines (data lines) extending in the vertical direction are laid on the LCD panel 2, and the pixels are arranged at the intersections of the m scan lines and the n signal lines.

In detail, the LCD driver 3 has a function of receiving an input image data Din from outside, specifically, from an image drawing circuit 4 and driving the signal lines of the LCD panel 2 in response to the input image data Din. As the image drawing circuit 4, a CPU and a DSP (Digital Signal Processor) are exemplified. In this embodiment, the input image data Din is a 24-bit data in which the gradation of each of the three sub pixels in each pixel is represented by 8 bits. In the following description, of the input image data Din, an 8-bit data for representing the gradation of the R sub pixel is noted as an R image data $Din^R$, an 8-bit data for representing the gradation of the G sub pixel is noted as a G image data $Din^G$, and an 8-bit data for representing the gradation of the B sub pixel is noted as a B image data $Din^B$. In addition, the LCD driver 3 also has a function of sequentially driving the m scan lines of the LCD panel 2. A sync signal 5, a dot clock signal DCK and other control signals are supplied to the LCD driver 3 from the image drawing circuit 4. The LCD driver 3 operates in response to each of the supplied control signals. The sync signal 5 supplied to the LCD driver 3 includes a vertical sync signal Vsync and a horizontal sync signal Hsync.

As detailed below, the LCD driver 3 performs different operations in accordance with the format of the image data Di. When the image data Di is supplied in the format of VGA, the LCD driver 3 executes a color reducing process to the image data Din to generate a color reduction image data, and drives the LCD panel 2 to display an image in its original size in response to the color reduction image data. On the other hand, when the image data Din is supplied in the format of QVGA, the LCD driver 3 executes the color reducing process to the image data Di, and executes an enlarging process to a quadruple size in response to the image data after the color reducing process. However, in the liquid crystal display apparatus 1 in this embodiment, when the image data Din is supplied in the format of QVGA, the special color reducing process and enlarging process are executed to suppress deterioration of the image effectively.

The configuration of the LCD driver 3 will be described below. The LCD driver 3 includes a control circuit 11, a color reducing circuit 12, a shift register circuit 13, a data register circuit 14, a latch circuit 15, a data switching circuit 16, a signal line driving circuit 17, a gradation voltage generating circuit 18, a scan line driving circuit 19 and a timing control circuit 20. In this embodiment, those circuits are monolithically integrated on one semiconductor chip. However, a part or all of the circuits may be integrated on different semiconductor chips or the LCD panel 2. For example, the scan line driving circuit 19 may be integrated as a different semiconductor chip or may be integrated on the LCD panel 2. Also, the LCD driver 3 may be integrated onto the LCD panel 2 by using an SOG (semiconductor on glass) technique.

The control circuit 11 has the following three functions. Firstly, the control circuit 11 has the function of transferring the image data Din sent from the image drawing circuit 4 to the color reducing circuit 12. Secondly, the control circuit 11 has the function of generating a timing signal 22 in response to the sync signal 5 and the dot clock signal DCK and supplying to the timing control circuit 20. Thirdly, the control circuit 11 has the function of determining whether the image data Din is sent in the format of VGA or in the format of QVGA, in each frame period, and then generating an enlarging process signal 23 in accordance with the determination result. In this embodiment, the control circuit 11 negates the enlarging process signal 23 (namely, sets the enlarging process signal 23 to "0" when the image data Din is sent in the format of VGA, and asserts the enlarging process signal 23 (namely, sets the enlarging process signal 23 to "1") when it is sent in the format of QVGA.

The color reducing circuit 12 is a circuit for executing the color reducing process to the image data Din by using error diffusion. The color reducing circuit 12 has the function of executing the color reducing process on the image data Din corresponding to one pixel in one clock period of the dot clock signal DCK. When the image data Din of the respective pixels are sequentially inputted, the color reducing circuit 12 sequentially executes the color reducing process on the input image data Din. The color reducing circuit 12 in this embodiment has the function of separately preparing two error values from the same image data Din and using these two error values to generate color reduction image data Dfrc1 and Dfrc2 of two kinds, respectively. Here, each of the color reduction image data Dfrc1 and Dfrc2 is the 18-bit data in which of each of the three sub pixels of each pixel is represented with 6 bits.

However, attention should be paid to the fact that the color reducing circuit 12 does not always generate the color reduction image data Dfrc1 and Dfrc2 of the two kinds from the image data Din. When the enlarging process signal 23 is negated (namely, when the image data Di is sent in the format of VGA), the color reducing circuit 12 executes an error diffusing process on the image data Di to generate the color reduction image data Dfrc1. On the other hand, when the enlarging process signal 23 is asserted (namely, when the image data Di is sent in the format of QVGA), the color reducing circuit 12 generates the two color reduction image data Dfrc1 and Dfrc2 by using the separately-prepared error values. The configuration of the color reducing circuit 12 will be described later in detail.

Figure 3:
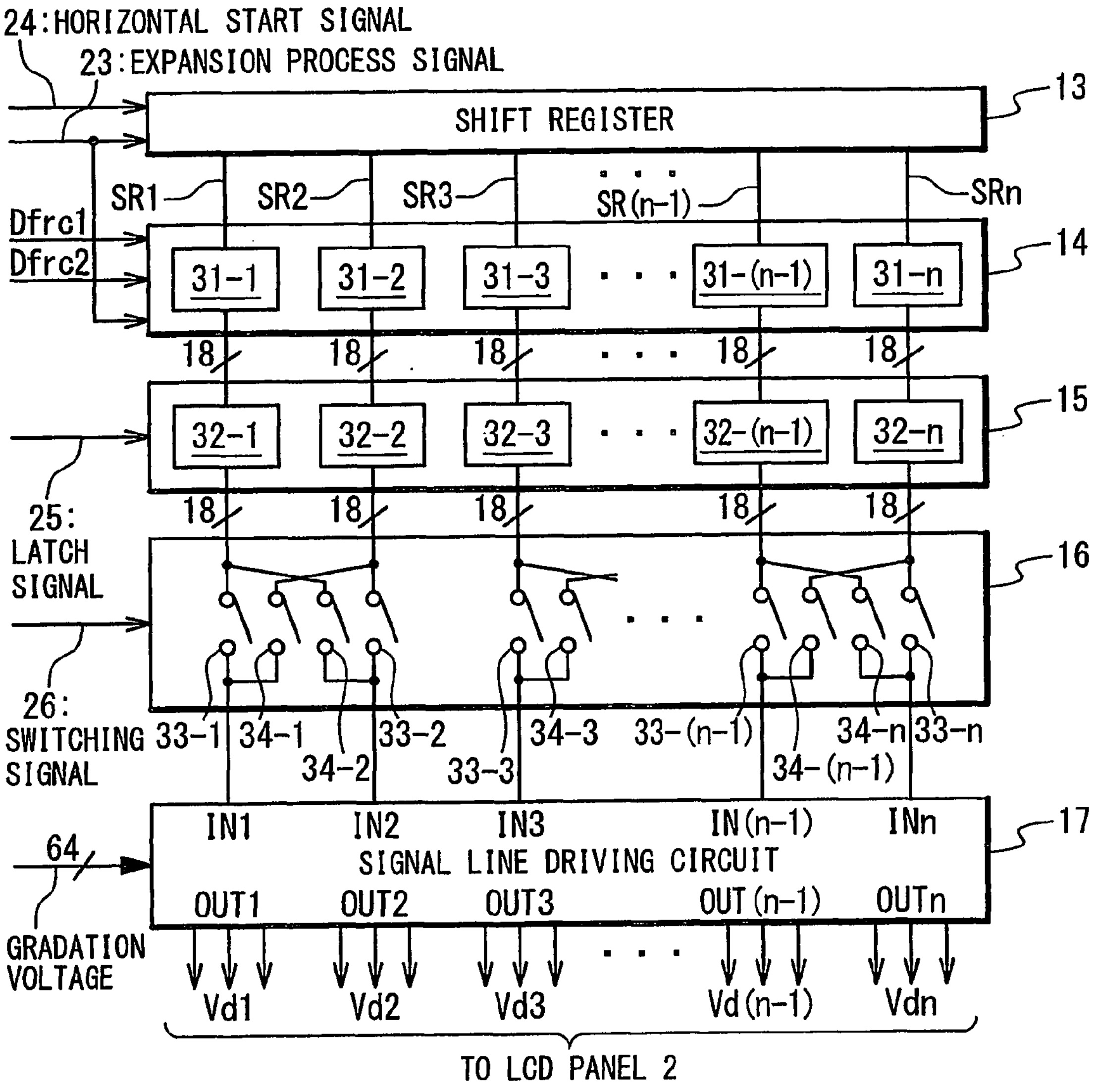
FIG. 3 is a block diagram showing the configuration of an LCD driver used in the liquid crystal display apparatus shown in FIG. 2 in detail.

The shift register circuit 13, the data register circuit 14, the latch circuit 15, the data switching circuit 16 and the signal line driving circuit 17 are a circuit group which functions as a driving section for driving the signal lines of the LCD panel 2 in response to the color reduction image data Dfrc1 and Dfrc2. In detail, the data register circuit 14 sequentially receives and holds the color reduction image data Dfrc1 and Dfrc2 from the color reducing circuit 12 under the control of the shift register circuit 13. In detail, as shown in FIG. 3, the shift register circuit 13 generates shift register output signals SR1 to SRn for controlling the data register circuit 14 in response to the enlarging process signal 23 and a horizontal start signal 24. The data register circuit 14 includes registers 31-1 to 31-*n* each holding the color reduction image data for one pixel. The operations of the registers 31-1 to 31-*n* in the data register circuit 14 are controlled on the basis of the shift register output signals SR1 to SRn supplied from the shift register circuit 13 and the enlarging process signal 23 supplied from the control circuit 11. The operations of the registers 31-1 to 31-*n* are different between the odd-numbered registers 31-(2*k*-1) and the even-numbered registers 31-(2*k*). The odd-numbered register 31-(2*k*-1) latches the color reduction image data Dfrc1, when the corresponding shift register output signal SR(2*k*-1) is pulled up, regardless of the state of the enlarging process signal 23. On the other hand, the even-numbered register 31-(2*k*) latches the color reduction image data Dfrc1, when the enlarging process signal 23 is negated, and the corresponding shift register output signal SR(2*k*-1) is pulled up, and latches the color reduction image data Dfrc2, when the enlarging process signal 23 is asserted.

The latch circuit 15 latches the color reduction image data from the data register circuit 14 in response to a latch signal 25 sent from the timing control circuit 20. As shown in FIG. 3, the latch circuit 15 includes latches 32-1 to 32-*n* each holding the color reduction image data for one pixel and has the configuration to latch the color reduction image data for one horizontal line at the same time. The latches 32-1 to 32-*n* respectively latch the color reduction image data from the registers 31-1 to 31-*n,* when the latch signal 25 is asserted.

The data switching circuit 16 transfers the color reduction image data outputted from the latch circuit 15 to the signal line driving circuit 17 in the original state or in a changed spatial order in response to a switching signal 26 sent from the timing control circuit 20. In detail, the data switching circuit 16 includes straight switches 33-1 to 33-*n* and cross switches 34-1 to 34-*n*, as shown in FIG. 3. The straight switches 33-1 to 33-*n* are connected between the latches 32-1 to 32-*n* of the latch circuit 15 and input ports IN1 to INn of the signal line driving circuit 17, respectively. The straight switches 33-1 to 33-*n* are used when the color reduction image data are transferred in their original states to the signal line driving circuit 17. When the switching signal 26 is negated, the straight switches 33-1 to 33-*n* are turned on, and the color reduction image data held in the latches 32-1 to 32-*n* are transferred through the straight switches 33-1 to 33-*n* to the input ports IN1 to INn of the signal line driving circuit 17, respectively. On the other hand, the cross switches 34-1 to 34-*n* are used to transfer the color reduction image data to the signal line driving circuit 17 while changing its spatial order. In detail, the cross switch 34-(2*k*-1) is connected between the latch 32-(2*k*) of the latch circuit 15 and the input port IN(2*k*-1) of the signal line driving circuit 17, and the cross switch 34-(2*k*) is connected between the latch 32-(2*k*-1) of the latch circuit 15 and the input port IN(2*k*) of the signal line driving circuit 17. When the switching signal 26 is asserted, the color reduction image data held in the odd-numbered latches 32-1, 32-3, . . . are transferred to the even-numbered input ports IN2, IN4, . . . of the signal line driving circuit 17, and the color reduction image data held in the even-numbered latches 32-2, 32-4, . . . are transferred to the odd-numbered inputs IN1, IN3, . . . of the signal line driving circuit 17.

The signal line driving circuit 17 drives the signal lines in the LCD panel 2 in response to the color reduction image data for one horizontal line sent from the latch circuit 15. Specifically, the signal line driving circuit 17 selects a gradation voltage corresponding to the gradation indicated by the color reduction image data, from a plurality of gradation voltages supplied from the gradation voltage generating circuit 18, and drives the corresponding signal line of the LCD panel 2 to the selected gradation voltage. In this embodiment, the number of gradation voltages supplied from the gradation voltage generating circuit 18 is 64 ($=2^6$). It should be noted that since the color reduction image data supplied to the signal line driving circuit 17 is the data indicating the gradations of the three sub pixels of one pixel, the three signal lines are driven in response to one color reduction image data. That is, in the signal line driving circuit 17, the three outputs are prepared for one input, and the three outputs are connected to the three signal lines. In FIG. 3, the three outputs corresponding to the input INk are collectively noted as "OUTk". An output enable signal 27 is supplied to the signal line driving circuit 17 from the timing control circuit 20, and when the output enable signal 27 is pulled up, the signal lines of the LCD panel 2 start to be driven.

Referring to FIG. 2 again, the scan line driving circuit 19 is a circuit for driving the scan lines of the LCD panel 2 in response to a scan line control signal 28 supplied from the timing control circuit 20.

The timing control circuit 20 has a role for performing the timing control of the entire LCD driver 3. In detail, the timing control circuit 20 generates the horizontal start signal 24, the latch signal 25, the switching signal 26, the output enable signal 27 and the scan line control signal 28, and supplies to the shift register circuit 13, the latch circuit 15, the data switching circuit 16, the signal line driving circuit 17 and the scan line driving circuit 19, respectively. The timing control of the LCD driver 3 is performed by the horizontal start signal 24, the latch signal 25, the switching signal 26, the output enable signal 27 and the scan line control signal 28.

(Configuration of Color Reducing Circuit)

Figure 4A:
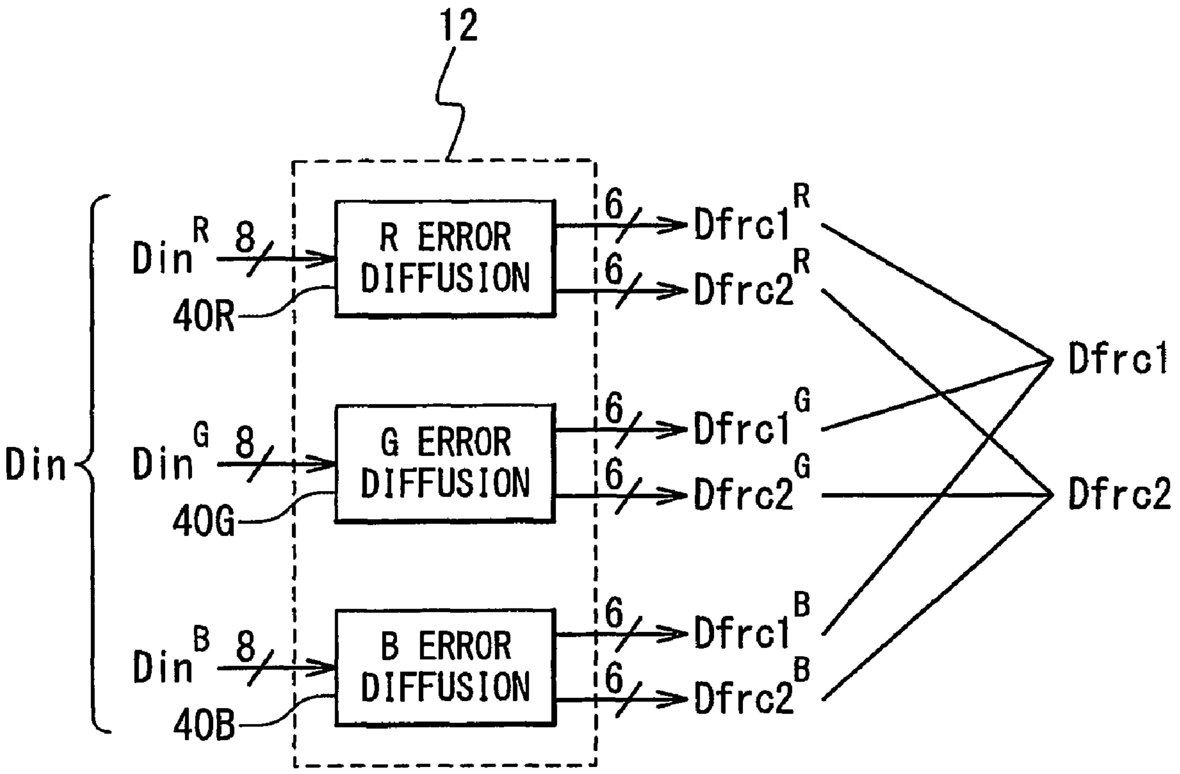
FIG. 4A is a block diagram showing the configuration of a color reducing circuit.

The configuration of the color reducing circuit 12 will be described below in detail. FIG. 4A is a block diagram showing the configuration of the color reducing circuit 12. As shown in FIG. 4A, the color reducing circuit 12 includes an R error diffusing circuit 40R, a G error diffusing circuit 40G and a B error diffusing circuit 40B. The R error diffusing circuit 40R has a function of executing the color reducing process on the R image data $Din^R$ of the input image data Din by the error diffusion and generating R color reduction image data Dfrc1$^R$ and Dfrc2$^R$. Similarly, the G error diffusing circuit 40G has a function of executing the color reducing process on the G image data $Din^G$ by the error diffusion and generating G color reduction image data Dfrc1$^G$ and Dfrc2$^G$, and the B error diffusing circuit 40B has a function of executing the color reducing process on the B image data $Din^B$ by the error diffusion and generating B color reduction image data Dfrc1$^B$ and Dfrc2$^B$. The color reduction image data Dfrc1 contains the R color reduction image data Dfrc1$^R$, the G color reduction image data Dfrc1$^G$ and the B color reduction image data Dfrc1$^B$, and the color reduction image data Dfrc2 contains the R color reduction image data Dfrc2$^R$, the G color reduction image data Dfrc2$^G$ and the B color reduction image data Dfrc2$^B$. As mentioned above, the color reduction image data Dfrc2 is generated only when the enlarging process signal 23 is asserted. That is, the R color reduction image data Dfrc2$^R$, the G color reduction image data Dfrc2$^G$ and the B color reduction image data Dfrc2$^B$ are generated only when the enlarging process signal 23 is asserted.

Figure 4B:
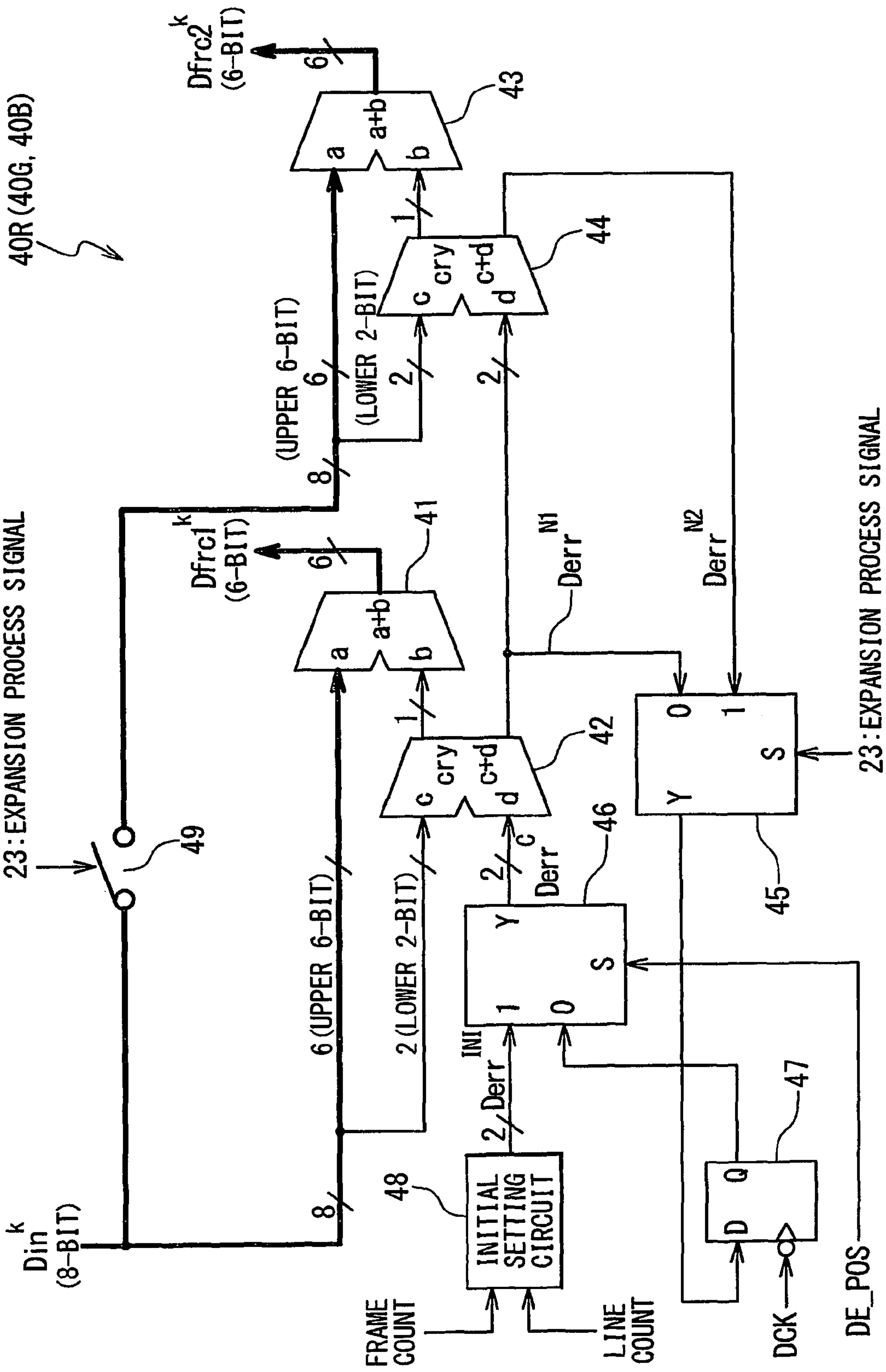
FIG. 4B is a block diagram showing the configuration of an R error diffusing circuit 40R, a G error diffusing circuit 40G and a B error diffusing circuit 40B.

FIG. 4B is a block diagram showing the configuration of the R error diffusing circuit 40R, the G error diffusing circuit 40G and the B error diffusing circuit 40B. The R error diffusing circuit 40R, the G error diffusing circuit 40G and the B error diffusing circuit 40B have the same circuit configuration. Thus, in FIG. 4B, the R image data $Din^R$, the G image data $Din^G$ and the B image data $Din^B$ are not discriminated, and they are noted as the image data $Din^k$. Similarly, the R color reduction image data Dfrc1$^R$, the G color reduction image data Dfrc1$^G$ and the B color reduction image data Dfrc1$^B$ are not discriminated, and they are noted as the color reduction image data Dfrc1$^k$. The R color reduction image data Dfrc2$^R$, the G color reduction image data Dfrc2$^G$ and the B color reduction image data Dfrc2$^B$ are not discriminated, and they are noted as the color reduction image data Dfrc2$^k$.

Each of the R error diffusing circuit 40R, the G error diffusing circuit 40G and the B error diffusing circuit 40B includes adding circuits 41 to 44, selectors 45 and 46, a D latch 47, an initial value setting circuit 48 and a switch 49.

The adding circuits 41 and 42 are a circuit portion for calculating the color reduction image data Dfrc1$^k$ and an error value Derr$^{N1}$ from the image data Din$^k$ and an error value Derr$^C$ outputted from the selector 46. Here, the error value Derr$^C$ is an error value used to generate the color reduction image data Dfrc1$^k$ of a target sub pixel. In detail, the adding circuit 42 adds the lower 2 bits of the image data Din$^k$ and the error value Derr$^C$, outputs an error value Derr$^{N1}$ from a data output c+d and outputs a 1-bit carry from a carry output cry. The adding circuit 41 adds the higher 6 bits of the image data Din$^k$ and the carry received from the adding circuit 42 and generates the color reduction image data Dfrc1$^k$.

The adding circuits 43 and 44 are a circuit portion for calculating the color reduction image data Dfrc2$^k$ and an error value Derr$^{N2}$ from the image data Din$^k$ and the error value Derr$^{N1}$ outputted by the adding circuit 42. In detail, the adding circuit 44 adds the lower 2 bits of the image data Din$^k$ and the error value Derr$^{N1}$, outputs an error value Derr from the data output c+d and outputs a 1-bit carry from the carry output cry. The adding circuit 43 adds the higher 6 bits of the image data Din$^k$ and the carry received from the adding circuit 44 and generates the color reduction image data Dfrc2$^k$.

In summary, the adding circuits 41 to 44 calculate the color reduction image data Dfrc1$^k$ and Dfrc2$^k$ and the error values Derr$^{N1}$ and Derr$^{N2}$ from the image data Din$^k$ and the error value Derr$^C$, by using the following equations:

$$Dfrc1^k=(Din^k[7:2]+(Din^k[1:0]+Derr^C))>>2,$$

$$Derr^{N1}=(Din^k[1:0]+Derr^C)\%4$$

$$Dfrc2^k=(Din^k[7:2]+(Din^k[1:0]+Derr^{N1}))>>2,$$

$$Derr^{N2}=(Din^k[1:0]+Derr^{N1})\%4$$

Here, Din$^k$[1:0] is the lower 2 bits of the image data Din$^k$, and Din$^k$[7:2] is the higher 6 bits of the image data Din$^k$. Also, ">>2" is a process of truncating the lower 2 bits (namely, in this case, the process that leaves only a carry when the carry is generated), and "%4" is a process of calculating a remainder when it is divided by 4 (namely, in this case, the process that truncates a carry when the carry is generated).

Also, the following process is executed on the color reduction image data Dfrc1$^k$ and Dfrc2$^k$ (although this is not illustrated in FIG. 4B):

$$\text{When } Dfrc1^k \geqq 63,\ Dfrc1^k=63$$

$$\text{When } Dfrc2^k \geqq 63,\ Dfrc2^k=63$$

The selector 45 selects one of the error values Derr$^{N1}$ and Derr$^{N2}$ in response to the enlarging process signal 23, and supplies the selected error value to the D latch 47. When the enlarging process signal 23 is negated (namely, when the image data Din is sent in the format of VGA), the selector 45 selects the error value Derr$^{N1}$. On the other hand, when the enlarging process signal 23 is asserted (namely, when the image data Din is sent in the format of QVGA), the selector 45 selects the error value Derr$^{N2}$.

The D latch 47 latches the error value selected by the selector 45 in synchronization with the dot clock signal DCK.

The selector 46 selects one of the error value outputted from the D latch 47 and an initial value Derr$^{INI}$ generated by the initial value setting circuit 48, as the error value Derr$^C$ in response to an error initial value read signal DE_POS. In driving the leftmost pixel on each horizontal line, the error initial value read signal DE_POS is asserted, and the initial value Derr$^{INI}$ is selected as the error value Derr$^C$. On the other hand, in driving the other pixels, the error initial value read signal DE_POS is negated, and the error value outputted from the D latch 47 is selected as the error value Derr$^C$.

The initial value setting circuit 48 is a circuit for giving the initial value Derr$^{INI}$ of an error used in the error diffusing process. A frame count indicating the number of a frame targeted for the color reducing process and a line count indicating the number of the targeted line are given to the initial value setting circuit 48. The initial value setting circuit 48 generates the initial value Derr$^{INI}$ that is different, depending on the frame and the line.

The switch 49 controls the supply of the image data Din$^k$ to the adding circuits 43 and 44 on the basis of the enlarging process signal 23. When the enlarging process signal 23 is negated (namely, when the image data Din is sent in the format of VGA), the switch 49 is turned off, and the supply of the image data Din$^k$ to the adding circuits 43 and 44 is stopped. On the other hand, when the enlarging process signal 23 is asserted (namely, when the image data Din is sent in the format of QVGA), the switch 49 is turned on, and the image data Din$^k$ is supplied to the adding circuits 43 and 44.

In the R error diffusing circuit 40R, G error diffusing circuit 40G and B error diffusing circuit 40B thus configured, the different operations are performed, depending on the state of the enlarging process signal 23. When the enlarging process signal 23 is negated, the switch 49 is turned off. Moreover, the selector 45 selects the error value Derr$^{N1}$. In this case, the R error diffusing circuit 40R, the G error diffusing circuit 40G and the B error diffusing circuit 40B operate similarly to the typical color reducing circuit to generate the color reduction image data Dfrc1$^k$ from the image data Din$^k$ and the error value Derr$^C$. As the error value latched by the D latch 47 (namely, the error value used to drive a next pixel), the error value Derr$^{N1}$ is selected. The color reduction image data Dfrc2$^k$ is not generated. On the other hand, when the enlarging process signal 23 is asserted, the switch 49 is turned on. Moreover, the selector 45 selects the error value Derr$^{N2}$. In this case, the R error diffusing circuit 40R, the G error diffusing circuit 40G and the B error diffusing circuit 40B generate the color reduction image data Dfrc1$^k$ by using the error value Derr$^C$ from the image data Din$^k$, and generate the color reduction image data Dfrc2$^k$ by using the error value Derr$^{N1}$. As the error value latched by the D latch 47 (namely, the error value used to drive the next pixel), the error value Derr$^{N2}$ is selected.

It should be noted that since the error value Derr$^{N1}$ generated by the adding circuit 42 is used for generation of the color reduction image data Dfrc2$^k$ by the adding circuits 43 and 44, this contributes to reduction in circuit scale. Unless the reduction in hardware is considered, the D-latch and the initial value setting circuit that are dedicated to the adding circuits 43 and 44 may be employed, separately from the D latch 47 and the initial value setting circuit 48. However, the initial value setting circuit especially requires the large circuit scale. Thus, although such configuration is possible, this is not preferable. As described in this embodiment, since the error value Derr$^{N1}$ is used for generation of the color reduction image data Dfrc2$^k$ by the adding circuits 43 and 44, the single initial value setting circuit can be used to generate the two error values, and the two color reduction image data can be generated from the two error values.

(Operation of Liquid Crystal Display Apparatus)

The operation of the liquid crystal display apparatus will be described below in detail.

Figure 5:
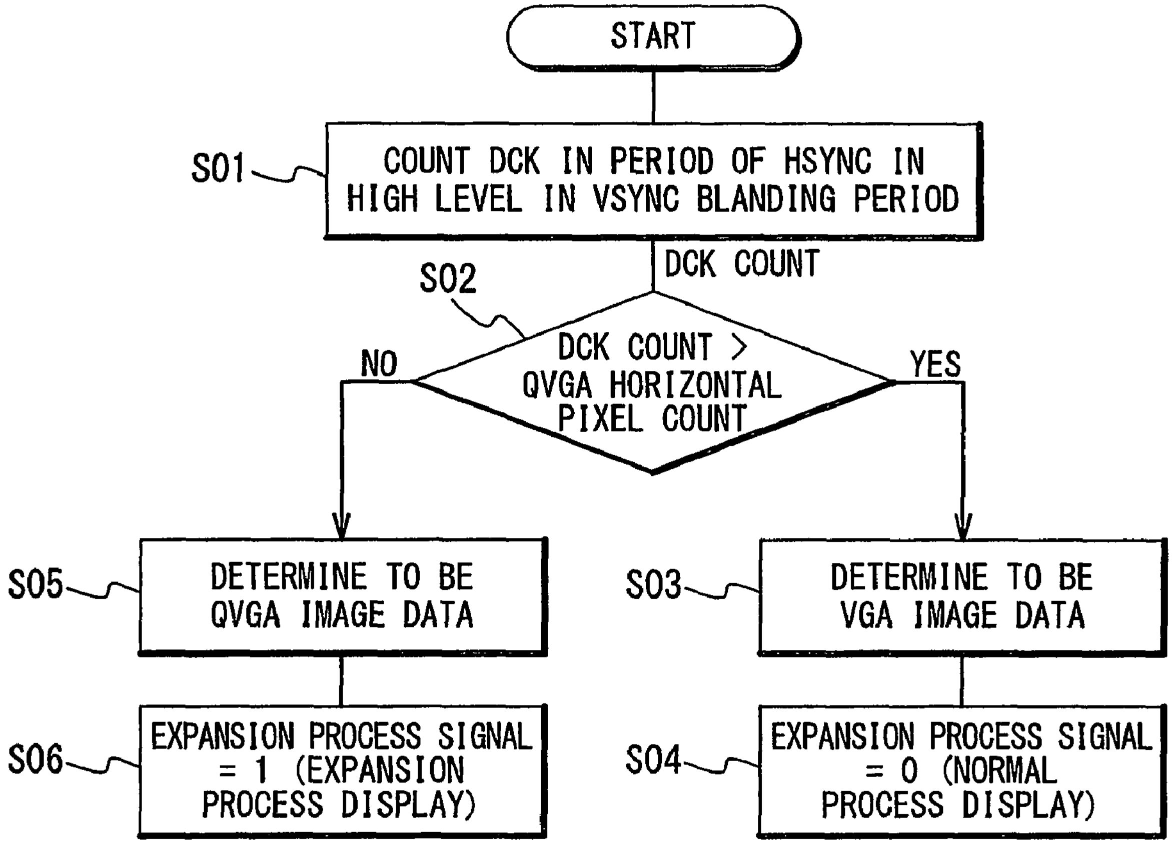
FIG. 5 is a flowchart showing an example of algorism for determining whether the image data is sent in the format of VGA or sent in the format of QVGA.
Figure 6:
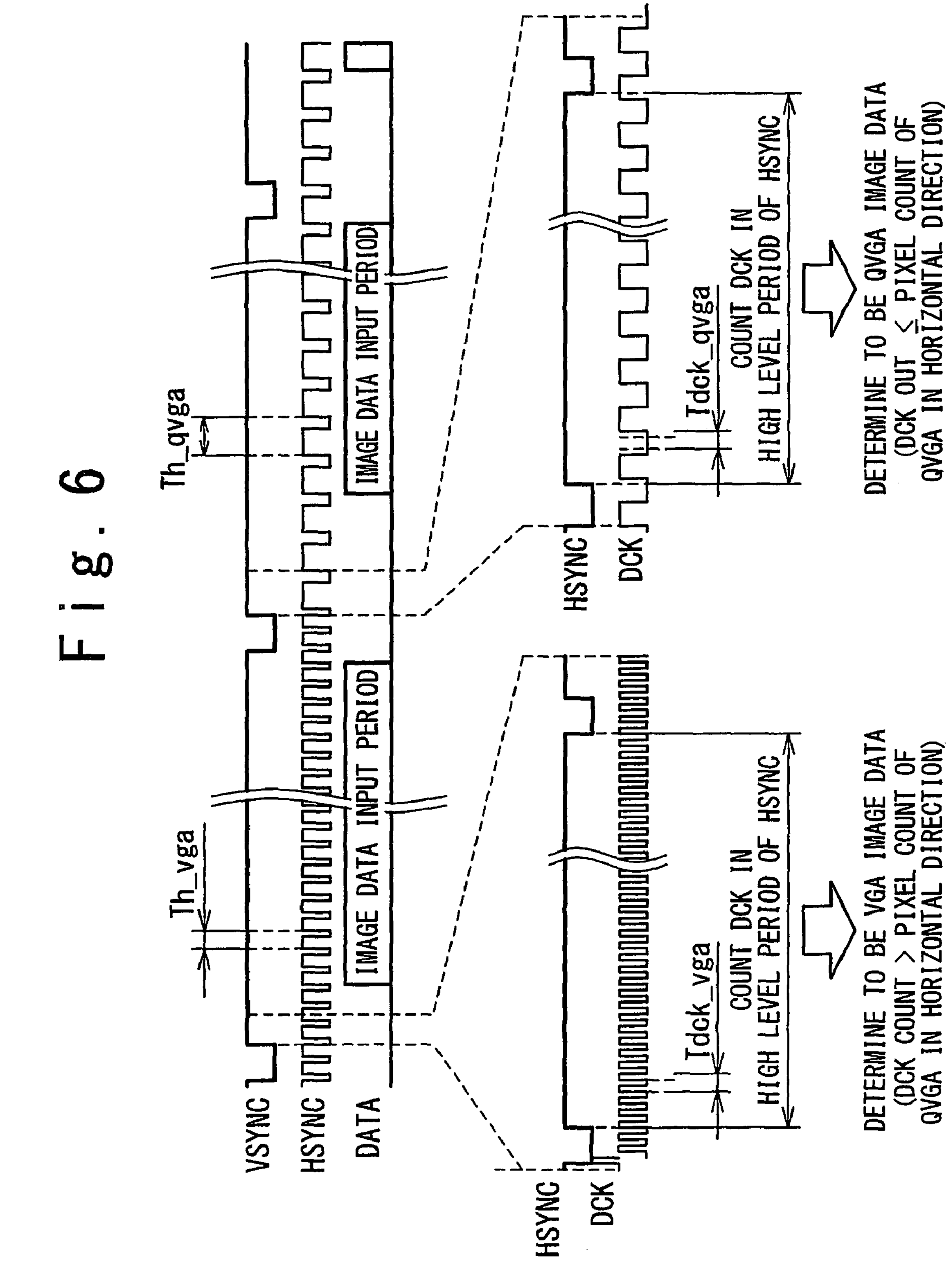
FIG. 6 is a timing chart showing the algorism for determining whether the image data is sent in the format of VGA or sent in the format of QVGA.

The control circuit 11 determines in beginning of each frame period, whether the image data Din is sent in the format of VGA or sent in the format of QVGA in the frame period. FIG. 5 is a flowchart showing an algorism of the determination, and FIG. 6 is a diagram showing the waveforms of the vertical sync signal Vsync, the horizontal sync signal Hsync and the dot clock signal DCK that are related to the determination. In FIG. 6, "Th_vga" indicates the length of one horizontal period when the image data Din is sent in the format of VGA, and "Tdck_vga" indicates the length of one clock period of the dot clock signal when the image data Din is sent in the format of VGA. Also, "Th_qvga" indicates the length of one horizontal period when the image data Din is sent in the format of QVGA, and "Tdck_qvga" indicates the length of one clock period of the dot clock signal when the image data Din is sent in the format of QVGA. In this embodiment, it should be noted that both of the vertical sync signal Vsync and the horizontal sync signal Hsync are low active.

With reference FIG. 5, the control circuit 11 counts the clock pulse of the dot clock signal DCK during a period during which the horizontal sync signal Hsync of a vertical synchronous blanking period is "High" (Step S01). Moreover, the control circuit 11 compares the clock pulse count with the number of the pixels for one horizontal line defined in QVGA (Step S02). If the clock pulse count is greater than the number of the pixels for one horizontal line defined in QVGA, the control circuit 11 determines that in the frame period, the image data Din is sent in the format of VGA (Step S03) and negates the enlarging process signal 23 (Step S04). If not so, the control circuit 11 determines that the image data Din is sent in the format of QVGA (Step S05) and asserts the enlarging process signal 23 (Step S06).

The operation of the LCD driver 3 is different, depending on the state of the enlarging process signal 23, namely, between a case where the image data Din is sent in the format of VGA and a case where it is sent in the format of QVGA. When the image data Din is sent in the format of VGA, the color reducing circuit 12 generates the color reduction image data Dfrc1 from the image data Din (similarly to the typical color reducing circuit). On the other hand, the LCD driver 3 operates to drive the LCD panel 2 so that the sent image is displayed as a whole in its original size.

Figure 7:
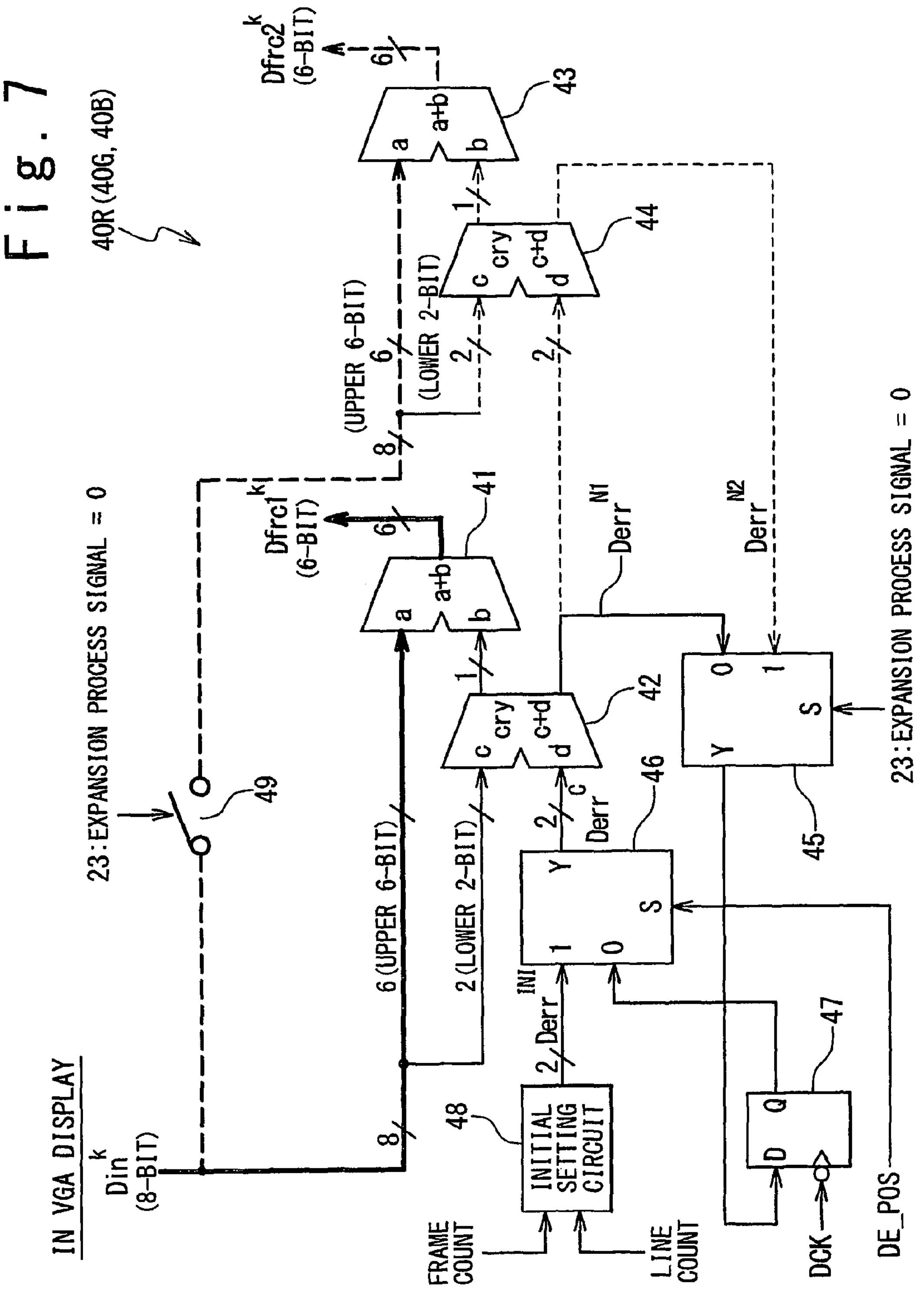
FIG. 7 is a block diagram showing an operation of the R error diffusing circuit, the G error diffusing circuit and the B error diffusing circuit when the image data is sent in the format of VGA.

FIG. 7 is a conceptual diagram showing the operations of the R error diffusing circuit 40R, the G error diffusing circuit 40G and the B error diffusing circuit 40B when the image data Din is sent in the format of VGA. In this case, it should be noted that the enlarging process signal 23 is negated. In response to the negation of the enlarging process signal 23, the switch 49 is turned off in each of the R error diffusing circuit 40R, the G error diffusing circuit 40G and the B error diffusing circuit 40B. Moreover, the selector 45 selects the initial value $Derr^{N1}$. As this result, the color reducing circuit 12 generates the color reduction image data Dfrc1 from the image data Din. The color reduction image data Dfrc2 is not generated.

Figure 8:
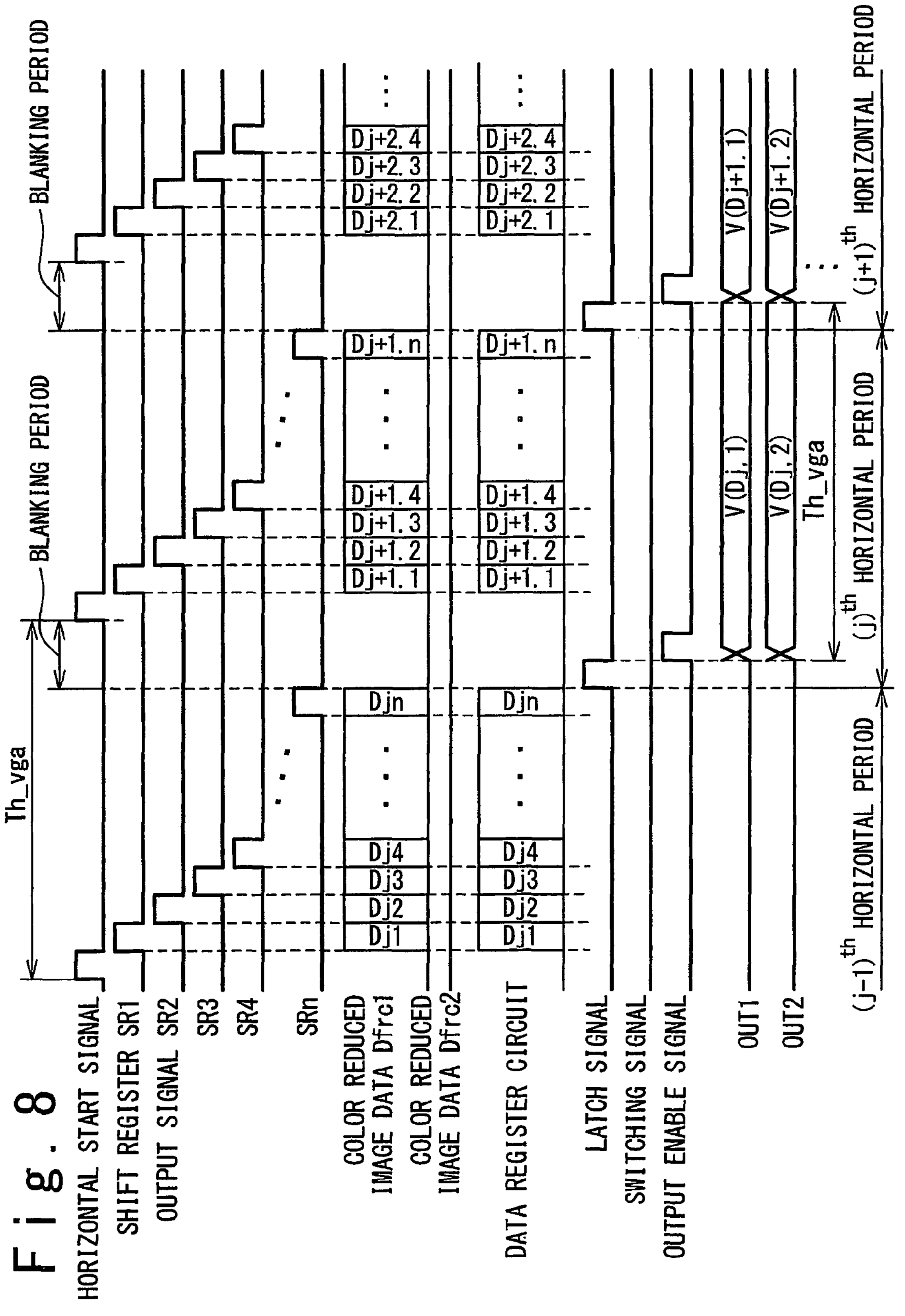
FIG. 8 is a diagram showing timing charts of the operation of the liquid crystal display apparatus when the image data is sent in the format of VGA.

The LCD panel 2 is driven in response to the color reduction image data Dfrc1. FIG. 8 is a diagram showing timing charts of the operations of the shift register circuit 13, the data register circuit 14, the latch circuit 15, the data switching circuit 16 and the signal line driving circuit 17 when the image data Din is sent in the format of VGA. In this embodiment, the image data Din used to drive the pixels in a $j^{th}$ horizontal period (namely, the image data Din used to drive the pixels on the $j^{th}$ horizontal line) is supplied in a $(j-1)^{th}$ horizontal period. The color reduction image data Dfrc1 used to drive the pixels in the $j^{th}$ horizontal period are generated from the image data Din and sequentially stored in the data register circuit 14.

In detail, when the blanking period of the $(j-1)^{th}$ horizontal period is completed and the horizontal start signal 24 is asserted, the shift register circuit 13 sequentially asserts the shift register output signals SR1 to SRn. In response to the assertion of the shift register output signals SR1 to SRn, the registers 31-1 to 31-*n* of the data register circuit 14 sequentially latch and hold the color reduction image data Dfrc1. In FIG. 8, it should be noted that the symbol "Dj,k" indicates the color reduction image data Dfrc1 of the $k^{th}$ pixel from the left side of the $j^{th}$ horizontal line.

Figure 9:
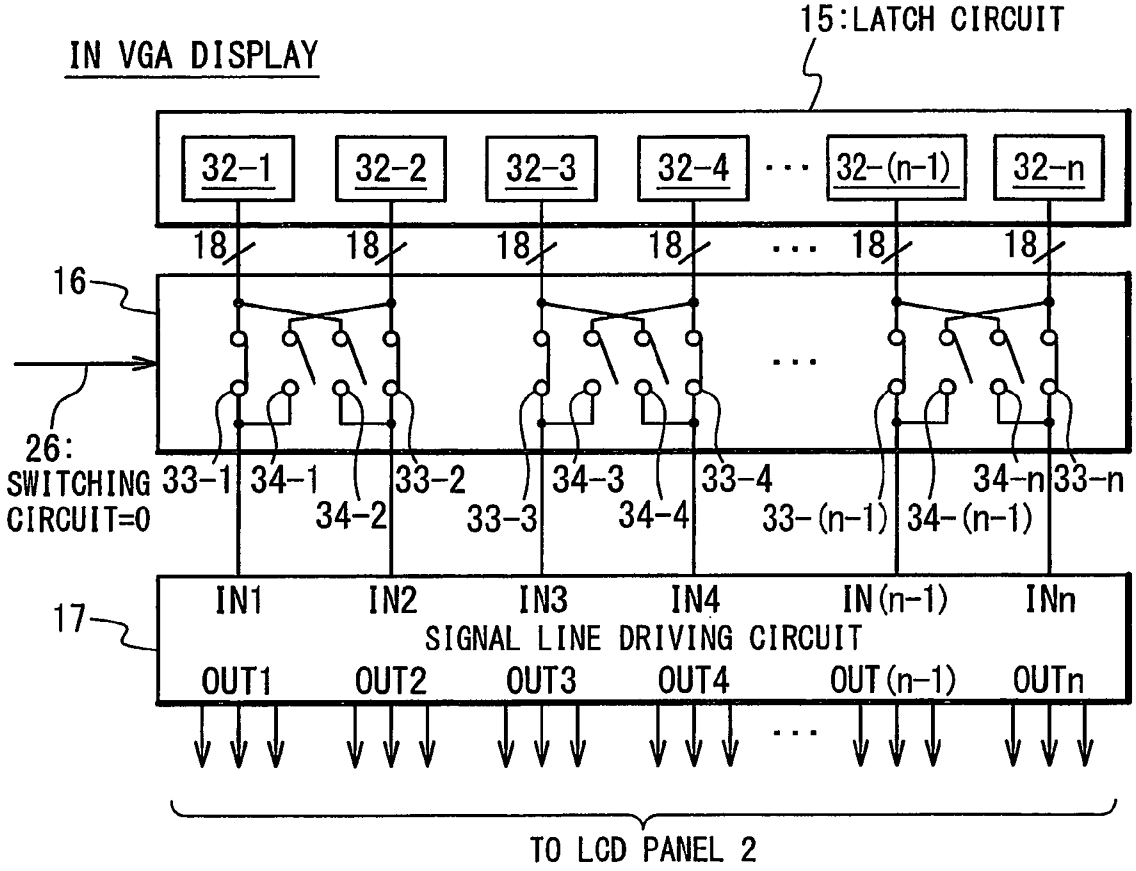
FIG. 9 is a block diagram showing the operation of a data switching circuit when the image data is sent in the format of VGA.

In succession, when the $j^{th}$ horizontal period is started, the latch signal 25 is asserted in the blanking period of the $j^{th}$ horizontal period. Consequently, the color reduction image data Dfrc1 used to drive the pixels in the $j^{th}$ horizontal period are latched by the latches 32-1 to 32-*n* of the latch circuit 15. At this time, since the switching signal 26 is negated, as shown in FIG. 9, the data switching circuit 16 transfers the color reduction image data latched in the latches 32-1 to 32-*n*, to the input ports IN1 to INn of the signal line driving circuit 17 in their original states (namely, without any change of the order), respectively. Moreover, since the output enable signal 27 is asserted, the signal line driving circuit 17 drives the signal lines on the basis of the color reduction image data. In synchronization with the driving of the signal line, the scan line corresponding to the $j^{th}$ horizontal line is driven by the scan line driving circuit 19. Thus, the pixels on the $j^{th}$ horizontal line are driven. In FIG. 8, V(Dj,k) indicates the drive voltage corresponding to the color reduction image data Dfrc1 of the $k^{th}$ pixel from the left side of the $j^{th}$ horizontal line.

According to such a driving procedure, in response to the color reduction image data Dfrc1 generated from the image data Din, the LCD panel 2 is driven such that the sent image is displayed in its original state.

On the other hand, when the image data Din is sent in the format of QVGA, the color reducing circuit 12 generates the color reduction image data Dfrc1 and Dfrc2 from the image data Din. On the other hand, the LCD driver 3 is operated to drive the LCD panel 2 so that the quadruple image which is double in each of the column and row directions, is displayed.

Figure 10:
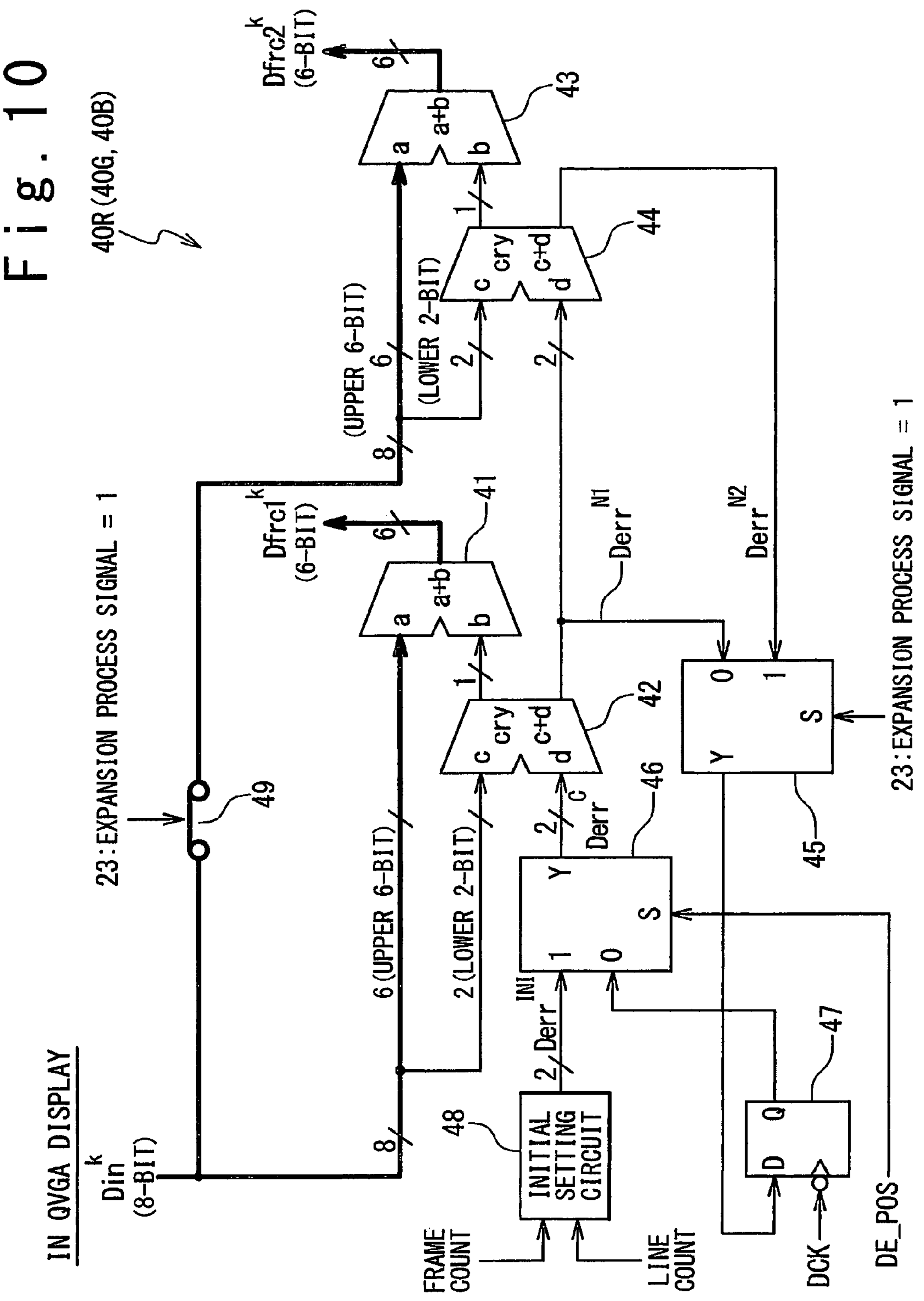
FIG. 10 is a block diagram showing the operations of the R error diffusing circuit, the G error diffusing circuit and the B error diffusing circuit when the image data is sent in the format of QVGA.

FIG. 10 is a functional block diagram showing the operations of the R error diffusing circuit 40R, the G error diffusing circuit 40G and the B error diffusing circuit 40B when the image data Din is sent in the format of VGA. In this case, it should be noted that the enlarging process signal 23 is asserted. In response to the assertion of the enlarging process signal 23, the switch 49 is turned on in each of the R error diffusing circuit 40R, the G error diffusing circuit 40G and the B error diffusing circuit 40B. Moreover, the selector 45 selects the initial value $Derr^{N2}$. In this case, the color reducing circuit 12 generates the color reduction image data Dfrc1 and Dfrc2 by using the error values $Derr^{C}$ and $Derr^{N1}$, respectively, from the image data Din.

Figure 11:
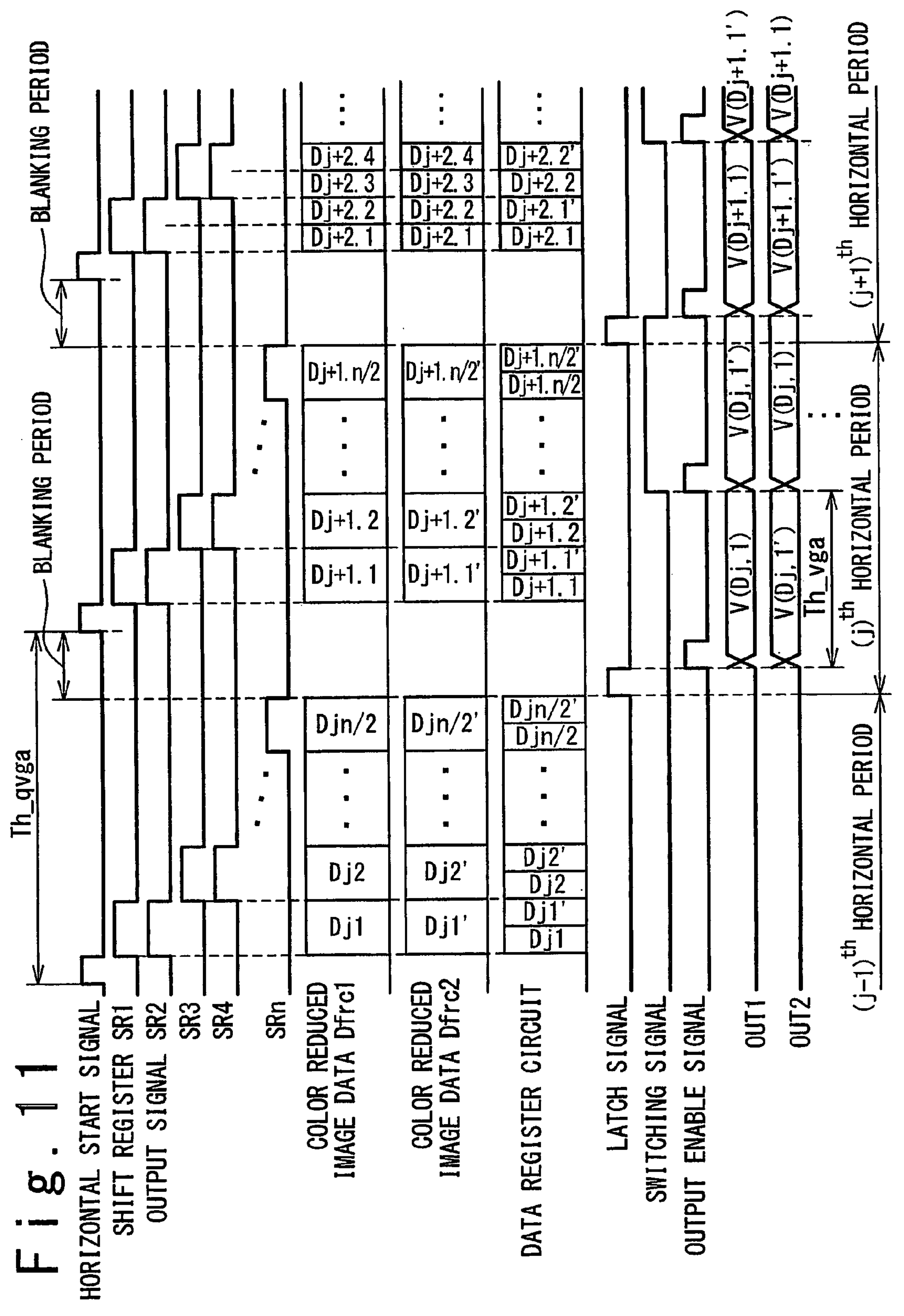
FIG. 11 is a diagram showing timing charts of the operation of the liquid crystal display apparatus when the image data is sent in the format of QVGA.

The LCD panel 2 is driven in response to the color reduction image data Dfrc1 and Dfrc2 such that the image size is made quadruple (double in each of column and row directions). FIG. 11 is a diagram showing timing charts of the operations of the shift register circuit 13, the data register circuit 14, the latch circuit 15, the data switching circuit 16 and the signal line driving circuit 17, when the image data Din is sent in the format of QVGA. When the image data Din used to drive the pixels in the $j^{th}$ horizontal period are supplied in the $(j-1)^{th}$ horizontal period, the color reduction image data Dfrc1 and Dfrc2 used to drive the pixels in the $j^{th}$ horizontal period are generated from the image data Din and sequentially stored in the data register circuit 14. In FIG. 11, it should be noted that the symbol "Dj,k" indicates the color reduction image data Dfrc1 generated from the image data Din of the $k^{th}$ pixel from the left side of the $j^{th}$ horizontal line in the QVGA image, and the symbol "Dj,k'" indicates the color reduction image data Dfrc2 generated from the image data Din of the same pixel.

In detail, the color reduction image data Dfrc1 is stored in the odd-numbered register 31-(2k-1) in the data register circuit 14, and the color reduction image data Dfrc2 is stored in the even numbered register 31-(2k) in the data register circuit 14. It should be noted that the two registers 31 latch the color reduction image data Dfrc1 and Dfrc2 at the same time. As shown in FIG. 11, for example, the shift register output signals SR1 and SR2 are asserted at the same time, and the registers 31-1 and 31-2 latch the color reduction image data Dfrc1 and Dfrc2 at the same time. In succession, the shift register output signals SR3 and SR4 are asserted at the same time, and the registers 31-3 and 31-4 latch the color reduction image data Dfrc1 and Dfrc2 at the same time. Hereinafter, in accordance with the similar procedure, the color reduction image data Dfrc1 is stored in the other odd-numbered register 31, and the color reduction image data Dfrc2 is stored in the other even numbered register 31.

The color reduction image data Dfrc1 and Dfrc2 are generated from the same image data Din. Thus, by the above-mentioned operations, the image is made doubled in the row direction. However, the laterally adjacent pixels are driven in accordance with the color reduction image data generated by using the differently prepared error value. Therefore, the spatial frequency of the brightness change is not decreased.

In succession, when the $j^{th}$ horizontal period is started, the latch signal 25 is asserted in the blanking period of the $j^{th}$ horizontal period. Thus, the color reduction image data Dfrc1 used to drive the pixels in the $j^{th}$ horizontal period are latched by the odd-numbered latch 32-(2k-1) in the latch circuit 15, and the color reduction image data Dfrc2 is latched by the even numbered latch 32-(2k).

When the image data Din is sent in the format of QVGA, the pixels on the different horizontal lines are driven between the front and back halves of the $j^{th}$ horizontal period. Thus, the LCD panel 2 is driven such that the image is made double in the column direction. That is, the pixels on the $(2j-1)^{th}$ horizontal line on the LCD panel 2 are driven in the front half of the $j^{th}$ horizontal period, and the pixels on the $(2j)^{th}$ horizontal line are driven in the front half of the $j^{th}$ horizontal period. Here, the state of the data switching circuit 16 is switched between the front and back halves of the $j^{th}$ horizontal period. Thus, the adjacent pixels in the column direction are driven in accordance with the different color reduction image data generated by using the different error value.

Figure 12A:
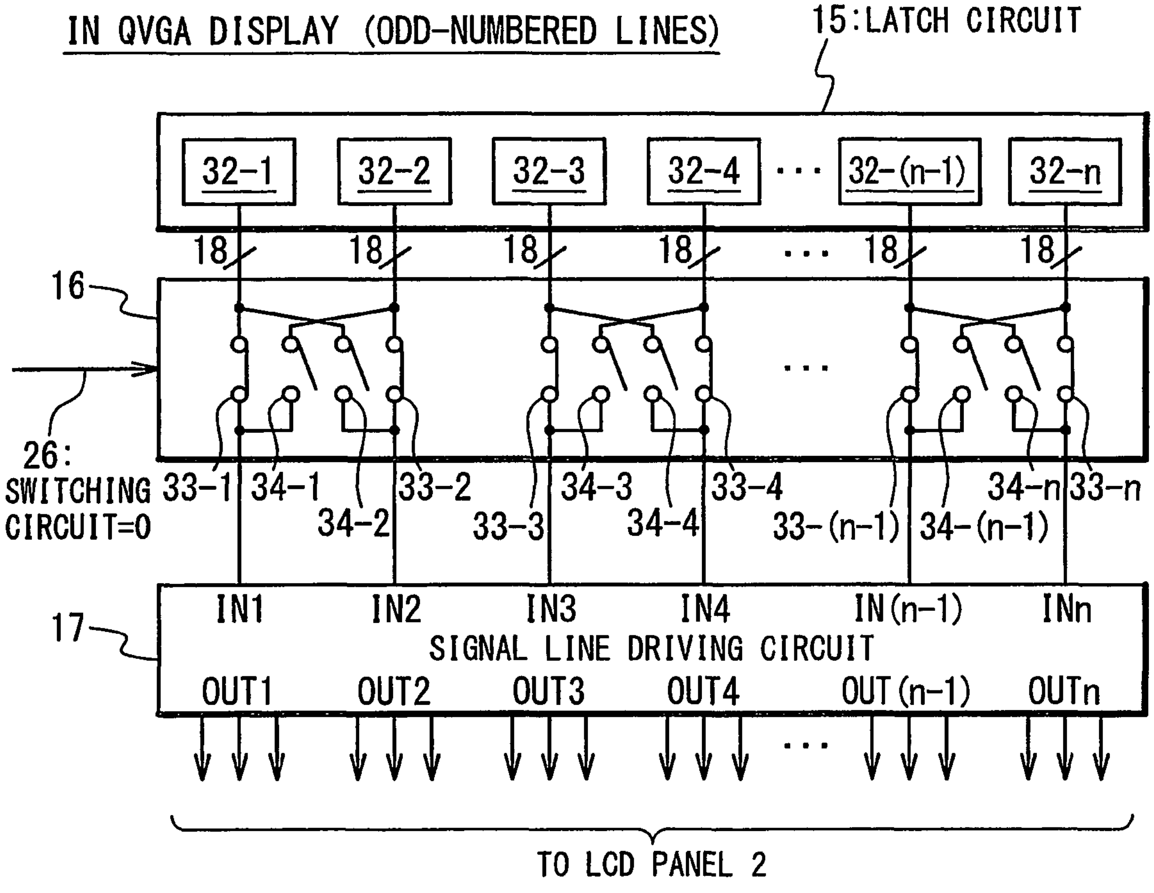
FIG. 12A is a block diagram showing the operation of the data switching circuit when the pixels on the $(2j-1)^{th}$ horizontal line are driven and the image data is sent in the format of QVGA.

In detail, the switching signal 26 is negated in the front half of the $j^{th}$ horizontal period, and as shown in FIG. 12A, the data switching circuit 16 transfers the color reduction image data latched in the latches 32-1 to 32-n to the input ports IN1 to INn of the signal line driving circuit 17 in their original states (namely, without any change of the order), respectively. As shown in FIG. 11, when the output enable signal 27 is asserted, the signal line driving circuit 17 drives the signal lines on the basis of the color reduction image data transferred to the inputs IN1 to INn. In synchronization with the driving of the signal lines, the scan line corresponding to the (2j-1)th horizontal line is driven by the scan line driving circuit 19. Thus, the pixels on the (2j-1)th horizontal line are driven. In FIG. 11, it should be noted that V(Dj,k) indicates a drive voltage corresponding to the color reduction image data Dfrc1 of the $k^{th}$ pixel from the left side of the $j^{th}$ horizontal line, and V(Dj,k') indicates a drive voltage corresponding to the color reduction image data Dfrc2 of the $k^{th}$ pixel from the left side of the $j^{th}$ horizontal line.

Figure 12B:
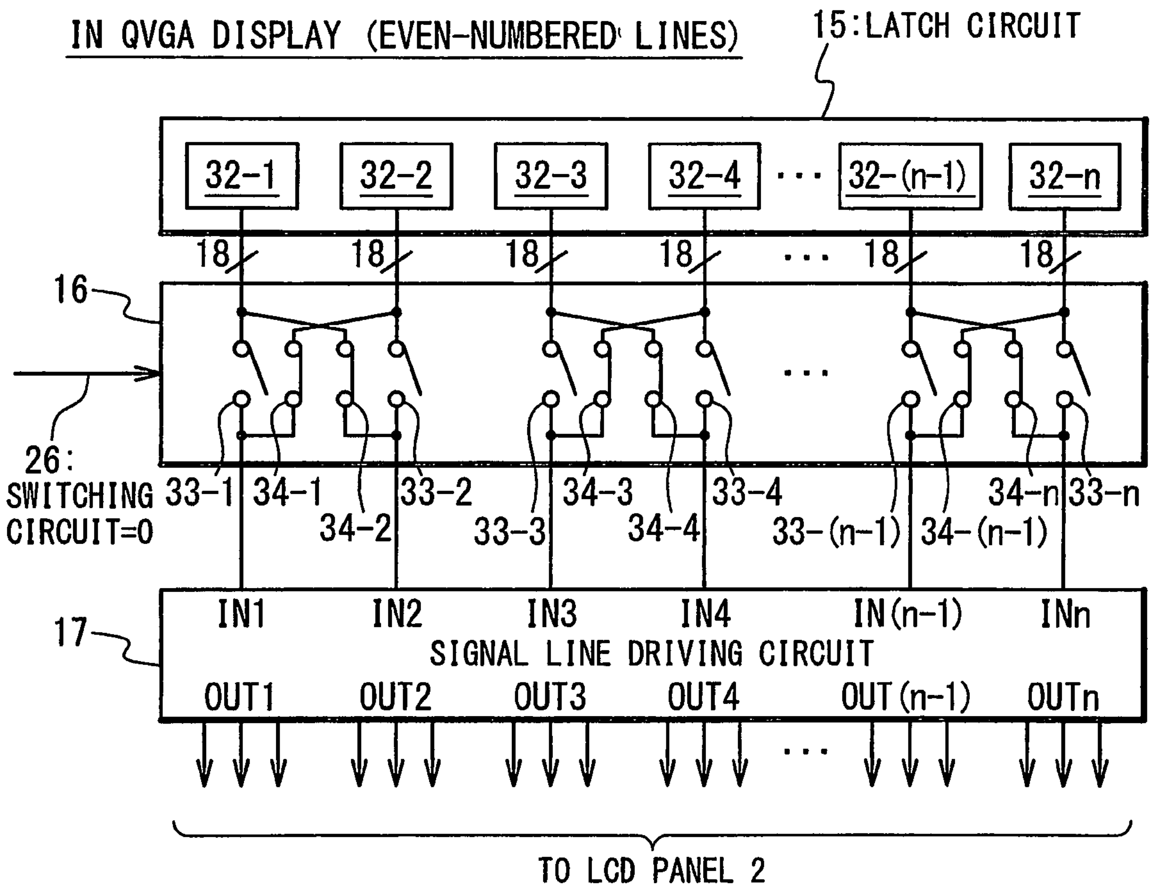
FIG. 12B is a block diagram showing the operation of the data switching circuit when the pixels on the $(2j)^{th}$ horizontal line are driven, and the image data is sent in the format of QVGA.

On the other hand, the switching signal 26 is asserted in the back half of the $j^{th}$ horizontal period, and as shown in FIG. 12B, the data switching circuit 16 transfers the color reduction image data latched in the latches 32-1 to 32-n to the input ports IN1 to INn of the signal line driving circuit 17 after the order is changed. In detail, the color reduction image data is transferred to the odd-numbered input port IN(2k-1) of the signal line driving circuit 17 from the even numbered latch 32-(2k), and the color reduction image data is transferred to the even numbered input port IN(2k) from the odd-numbered latch 32-(2k-1). As shown in FIG. 11, when the output enable signal 27 is asserted, the signal line driving circuit 17 drives the signal lines on the basis of the color reduction image data transferred to the input ports IN1 to INn. In synchronization with the signal line, the scan line corresponding to the $(2j)^{th}$ horizontal line is driven by the scan line driving circuit 19. Thus, the pixels on the $(2j)^{th}$ horizontal line are driven.

Figure 13:
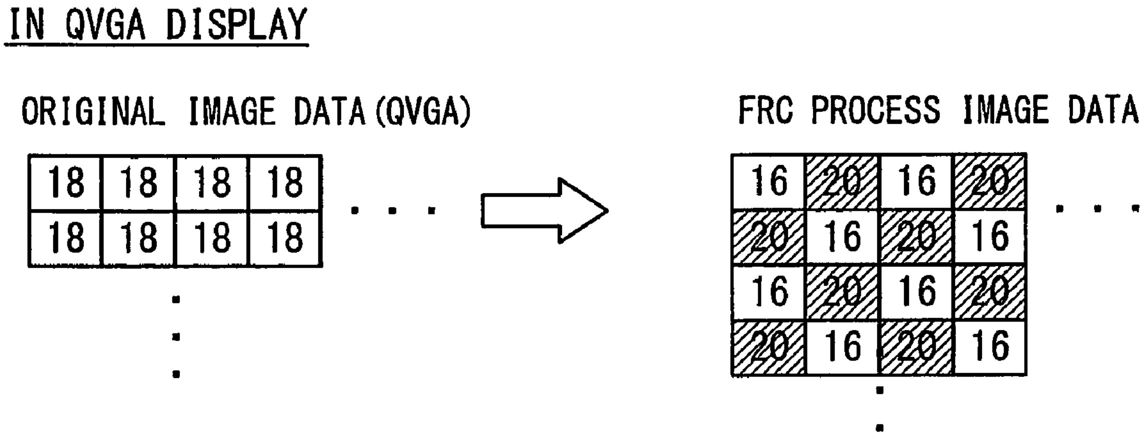
FIG. 13 is a diagram of an example of display on the LCD panel, when the image data is sent in the format of QVGA.

According to the above-mentioned operations, the adjacent pixels are driven in both of the row direction and the column direction in accordance with the different color reduction image data generated by using the separately prepared error values. For example, as shown in FIG. 13, it is assumed that the image data of QVGA format in which the gradation values of all the image data are 18 is obtained. In this embodiment, when the enlarging process is executed to make the image double in each of the column and row directions, after the color reducing process is executed on the image data of the QVGA format, the pixel whose gradation value is 16 and the pixel whose gradation value is 20 are alternately arranged in both of the column direction and the row direction, on the LCD panel 2. Thus, the reduction in the spatial frequency of the brightness change is not generated, and the flicker generation can be suppressed effectively.

Also, in the above-mentioned embodiments, the image data Din is a 24-bit data in which the gradation of each of the three sub pixels of each pixel is represented with 8 bits, and each of the color reduction image data Dfrc1 and Dfrc2 is a 18-bit data in which the gradation of each of the three sub pixels of the pixel is represented with 6 bits. However, it is evident that the number of bits of the image data Din and the color reduction image data Dfrc1 and Dfrc2 may be properly changed.

Moreover, in this embodiment, the image data Din is sent in the format of VGA or QVGA. However, the present invention can be typically applied to a case that the image of a first format and the image of a second format having a double size of the image of the first format in both of the column direction and the row direction are selectively supplied to a display panel driver.

Moreover, in the above-mentioned embodiments, a case that the present invention is applied to the driving of the LCD driver has been described. However, the present invention may be applied to the other display panels such as a plasma display panel and this may be evident for one skilled in the art.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A display apparatus comprising:

a display panel; and a display panel driver configured to drive signal lines of said display panel, wherein said display panel driver comprises:

a color reducing circuit configured to generate a color reduction image data from an input image data by executing an error diffusion process by using an error value; and a driving section configured to drive each of a plurality of pixels of said display panel in response to the color reduction image data, wherein when the input image data is supplied as a first image data of a first image display format, said color reducing circuit generates a first color reduction image data from the input image data by executing the error diffusion process by using a first error value, and generates a second color reduction image data from the input image data by executing the error diffusion process by using a second error value different from the first error value, wherein said driving section drives a first pixel positioned on a horizontal line of said display panel in response to the first color reduction image data and drives a second pixel positioned on the horizontal line and adjacent to said first pixel in a horizontal direction in response to the second color reduction image data, wherein when the input image data is supplied as an image data which includes a second input image data corresponding to said first pixel and a third input image data corresponding to said second pixel and which has a second image display format different from the first image display format, said color reducing circuit generates a third color reduction image data from the second input image data by executing the error diffusion process by using the first error value and generates a fourth color reduction image data from the third input image data by executing the error diffusion process by using the first error value, and wherein said driving section drives said first pixel in response to the third color reduction image data and drives said second pixel in response to the fourth color reduction data.

2. A display apparatus comprising:

a display panel; and a display panel driver configured to drive signal lines of said display panel, wherein said display panel driver comprises:

a color reducing circuit comprising:

a first circuit section configured to generate a first color reduction image data and a second error value from a first input image data supplied as an image data of a first image display format to said color reducing circuit, by executing an error diffusion process by using a first error value; and a second circuit section configured to generate a second color reduction image data from the first input image data by executing the error diffusion process by using a the second error value, which is different from the first error value, and to generate a third error value, in addition to the second color reduction image data, by executing the error diffusion process by using the second error value;

a first selector configured to select one of the second error value and the third error value;

a latch configured to latch a selected error value from said first selector;

an initial value setting circuit configured to output an initial value; and a second selector configured to select one of a latched selected error value outputted from said latch and an initial value as the first error value;

a driving section configured to drive a first pixel positioned on a horizontal line of said display panel in response to the first color reduction image data, and drive a second pixel positioned on said horizontal line and adjacent to said first pixel in a horizontal direction, in response to the second color reduction image data, wherein when a second input image data corresponding to said first pixel and a third input image data corresponding to said second pixel are supplied as an image data of a second image display format different from the first image display format, said color reducing circuit generates a third color reduction image data from the second input image data by executing the error diffusion process by using the first error value and generates a fourth color reduction image data from the third input image data by executing the error diffusion process by using the first error value, and said driving section further drives said first pixel in response to the third color reduction image data and further drives said second pixel in response to the fourth color reduction image data, and wherein said first selector selects the third error value when the first input image data of the first image display format is supplied and selects the second error value when the second input image data and the third input image data of the second image display format are supplied.

3. The display apparatus according to claim 2, wherein a number of pixels of the image data of the second image display format in the horizontal direction is twice of a number of pixels of the image data of the first image display format in the horizontal direction.

4. The display apparatus according to claim 2, wherein said driving section drives a third pixel positioned on a horizontal line next to said horizontal line and adjacent to said first pixel in a vertical direction, in response to the second color reduction image data, and drives a fourth pixel positioned on the next horizontal line and adjacent to said second pixel in the vertical direction, in response to the first color reduction image data.

5. The display apparatus according to claim 4, wherein said driving section comprises:

a latch circuit comprising a first latch configured to latch the first color reduction image data and a second latch configured to latch the second color reduction image data;

a signal line driving circuit having a first input port and a second input port, and configured to drive a first signal line corresponding to said first pixel in response to a data supplied to the first input port and drive a second signal line corresponding to said second pixel in response to a data supplied to the second input port; and a data switching circuit configured to switch a connection relation between said first and second latches and said first and second input ports of said signal line driving circuit.

6. The display apparatus according to claim 2, wherein when the first input image data is supplied as the image data of the first image display format, said driving section drives a third pixel positioned on a horizontal line next to said horizontal line and adjacent to said first pixel in a vertical direction, in response to the second color reduction image data, and drives a fourth pixel positioned on said next horizontal line and adjacent to said second pixel in the vertical direction, in response to the first color reduction image data, wherein when a fourth input image data corresponding to said third pixel and a fifth input image data corresponding to said fourth pixel are supplied as image data of the second image display format, said color reducing circuit generates the fifth color reduction image data by executing the error diffusion process to the fourth input image data, and generates a sixth color reduction image data by executing the error diffusion process to the fifth input image data, and wherein said driving section drives said third pixel in response to the fifth color reduction image data and drives said fourth pixel in response to the sixth color reduction image data.

7. The display apparatus according to claim 5, wherein said driving section comprises:

a latch circuit comprising first and second latches operating in response to a latch signal;

a signal line driving circuit having a first input port and a second input port, and configured to drive a first signal line corresponding to said first pixel and said third pixel in response to a data supplied to said first input port and drive a second signal line corresponding to said second pixel and said fourth pixel in response to a data supplied to said second input port; and a data switching circuit configured to switch connection relation between said first and second latches and said first and second input ports of said signal line driving circuit, wherein when the first input image data is supplied as the image data of the first image display format, said first latch and said second latch receive the first color reduction image data and the second color reduction image data, respectively, wherein said data switching circuit supplies the first color reduction image data from said first latch to said first input port and the second color reduction image data from said second latch to the second input port, when the pixel on said horizontal line is to be driven, and supplies the second color reduction image data from said first latch to said second input port and supplies the second color reduction image data from said second latch to said first input port when the pixel on said next horizontal line is to be driven, wherein when the second to fourth input image data are supplied as image data of the second image display format, said first latch receives the third color reduction image data and fifth color reduction image data, and said second latch receives the fourth color reduction image data and a sixth color reduction image data, and wherein said data switching circuit supplies the third color reduction image data from said first latch to said first input port and supplies the fourth color reduction image data from said second latch to said second input port, when the pixel on said horizontal line is to be driven, and supplies the fifth color reduction image data from said first latch to said first input port and supplies the sixth color reduction image data from said second latch to said second input port, when the pixel on said next horizontal line is to be driven.

8. The display apparatus according to claim 6, wherein a number of pixels in the image data of the second image display format in a vertical direction is twice of a number of pixels in the image data of the first image display format image in the vertical direction.

* * * * *